Figure 1:
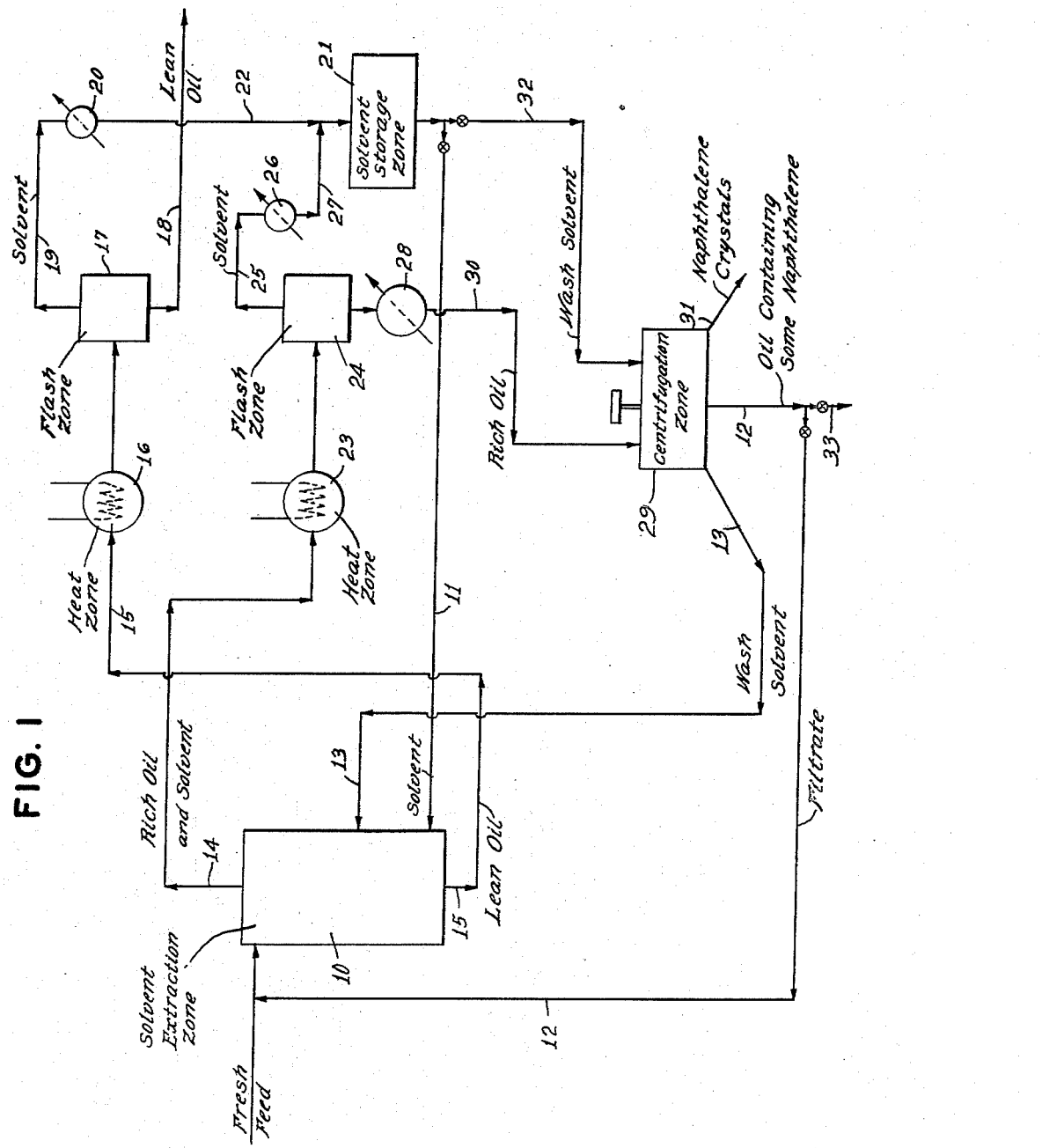

Aug. 17, 1954     K. A. SMITH     2,686,818
EXTRACTION PROCESS FOR RECOVERING NAPHTHALENE
Filed June 16, 1949     2 Sheets-Sheet 1

INVENTOR.
*Kenneth A. Smith*
BY
*Pennie Edmonds Morton and Barrows*
ATTORNEYS

Patented Aug. 17, 1954

2,686,818

UNITED STATES PATENT OFFICE 2,686,818

EXTRACTION PROCESS FOR RECOVERING NAPHTHALENE

Kenneth A. Smith, Steger, Ill., assignor to Sinclair Refining Company, New York, N. Y., a corporation of Maine Application June 16, 1949, Serial No. 99,463

3 Claims. (Cl. 260—674)

This invention relates to the recovery of naphthalene from naphthalene-containing stocks, for instance, light cycle oils, by solvent extraction with a lower aliphatic alcohol, e. g., methanol.

Certain refinery stocks, particularly light cycle oils, are known to contain naphthalene in such amount as to make recovery commerically profitable. For instance, a cut prepared by distillation, boiling between about 400 to 435° F., may contain about 10% to 15% or more naphthalene. Further distillation, however, will not readily concentrate the naphthalene so as to facilitate removal. It has been proposed to recover the naphthalene by chilling such a stock to a low temperature, say about minus 10° F., and to then centrifuge or filter out the naphthalene crystals formed at this low temperature. However, this process suffers several disadvantages in that expensive apparatus are required and operating costs are high.

I have found that naphthalene may be simply and economically recovered from a naphthalene-containing stock, e. g., a light cycle oil, by solvent extraction with a lower aliphatic alcohol. My invention comprises contacting a naphthalene-containing stock with a lower aliphatic alcohol, e. g., methanol, recovering a solvent fraction enriched in naphthalene-containing oil, separating the solvent therefrom, and then removing the naphthalene from the oil mixture. The naphthalene crystals may form in the rich oil from the extraction zone under normal atmospheric conditions; however, a chilling of the mixture prior to removal can be used to considerable advantage. The extraction solvent is preferably removed from the rich oil fraction by distillation. It is then condensed and recirculated in the process either for extraction or washing of the naphthalene crystals.

According to my invention napthalene is extracted from a naphthalene-containing stock, for instance, a naphthalene-containing stock boiling in the range of 400 to 435° F. As a solvent I use a lower aliphatic alcohol. In particular, methanol and ethanol are highly satisfactory in that both are partially miscible with the naphthalene-containing stock, readily volatile, and extract naphthalene in economically practicable yields. The extraction conditions of temperature and pressure may vary considerably, but should be of such magnitude that the solvent is in liquid form and remains partially miscible with the feed stock. Excessive temperatures are to be avoided, since solubility increases with temperature until complete miscibility is effected. In addition, temperatures should not be so high as to be in the range of the boiling point of the solvent. On the other hand, low temperatures promote formation of naphthalene crystals in the feed oil which may result in plugging of the system. For methanol extraction temperatures in the range of 60 to 160° F. are most satisfactory. Methanol to oil ratios of about 0.5 to 2.0 by volume are preferred; the contact is advantageously countercurrent.

Although naphthalene crystals may form in the rich oil taken from the extraction zone after the solvent is removed, my invention also contemplates chilling the solvent-free rich oil prior to removal of the naphthalene crystals. Removal of the naphthalene crystals is advantageously accomplished by, e. g., centrifugation, filtration or decantation. After separation of the rich oil component from the feed stock, the solvent is removed therefrom. This is advantageously accomplished by distillation. The solvent may then be condensed and recirculated either for use in extraction of the fresh feed or for washing of the naphthalene crystals or for both purposes. Thus recirculation of the solvent renders my process susceptible of greater efficiency.

After the solvent has been separated from the solvent fraction enriched in naphthalene-containing oil and the naphthalene crystals have been removed therefrom, the filtrate, which contains some naphthalene, may be recycled for additional extraction. In this case to prevent a buildup of aromatics in the system, a slip stream may be taken from the filtrate recycle line.

Figure 2:
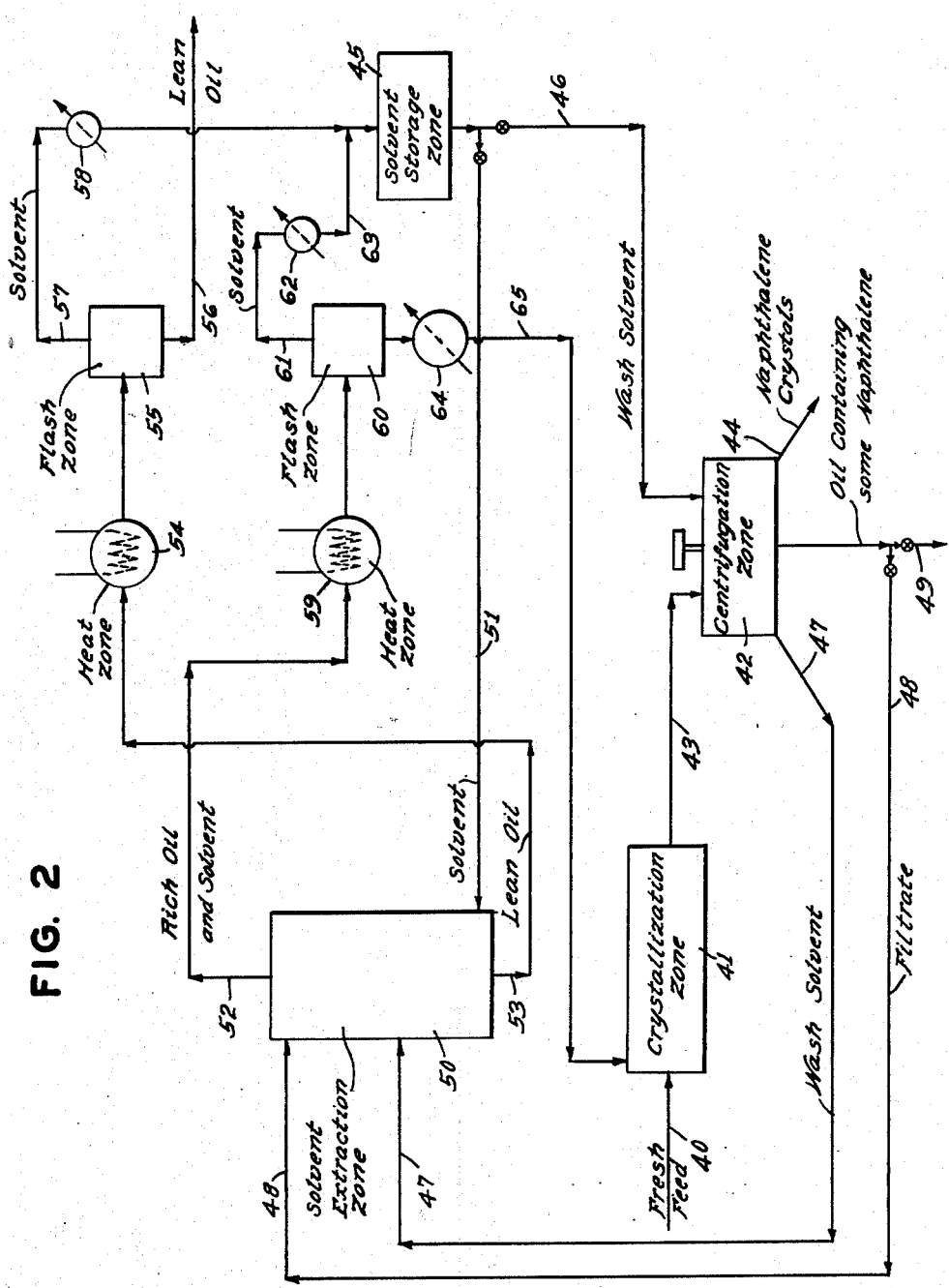

The accompanying drawings illustrate more clearly my invention. Figure 1 is a somewhat schematic flow diagram of a process embodying this invention wherein the naphthalene crystallizes out under normal atmospheric conditions. Figure 2 illustrates a process wherein a chilling of the extract oil is employed to recover the naphthalene.

In the embodiment illustrated in Figure 1, a feed oil, say a 400 to 435° F. distillation cut of a light cycle oil, is introduced into extraction zone 10 so as to be countercurrently contacted with a solvent selected from the lower aliphatic alcohols, for instance, methanol, introduced by line 11. For maximum efficiency recycle oil containing some naphthalene is also fed to the extraction zone by line 12, while wash solvent from the centrifugation zone is introduced from line 13. A liquid-liquid extraction is effected in the solvent extraction zone 10 at a temperature, for instance, when methanol is employed, in the range of 60 to 160° F. In any event, the conditions of temperature and pressure are regulated so that the solvent is in liquid form and remains only partially miscible. A solvent fraction enriched in naphthalene-containing oil is taken off overhead by line 14, while a lean oil fraction containing little or no solvent, is removed as a bottoms product by line 15. The lean oil is passed to heat zone 16, heated, and the solvent recovered therefrom by distillation, e. g., flashing in flash zone 17. The solvent free lean oil is removed from the system as a by-product by line 18. The flashed solvent is taken from the flash zone 17 by line 19, condensed in condensing zone 20, and passed to solvent storage zone 21 by line 22. The solvent fraction containing the naphthalene-rich oil is passed by line 14 to heat zone 23, heated, and the solvent recovered therefrom by distillation, for instance, flashing in flash zone 24. The flashed solvent is taken from the flash zone 24 by line 25, condensed in condensing zone 26, and passed to solvent storage zone 21 by line 27. The solvent storage zone is used to supply the extraction and wash solvents as needed in the process. The naphthalene-rich oil, free of solvent, is cooled in cooling zone 28, and passed to centrifugation zone 29 by line 30. Naphthalene crystals may form in the rich oil under normal atmospheric conditions, depending upon the original contents of the light cycle oil and the extraction efficiency. The mixture is then centrifuged and the naphthalene crystals removed by line 31. A wash solvent, preferably the same solvent used in the solvent extraction zone, may be used. The wash solvent, taken from storage zone 21, is introduced to the centrigugation zone 29 by line 32; it is taken off by line 13 and may be recirculated to the extraction zone. A slip stream 33 is taken off from the filtrate recirculating line 12 so as to prevent a buildup of aromatics in the process.

Figure 2 illustrates somewhat schematically another flow diagram of the process embodying my invention wherein the naphthalene-rich oil, free of solvent, is chilled prior to removing the naphthalene crystals. In this process the naphthalene-containing feed stock, introduced through line 40, is contacted with the naphthalene-rich oil, free of solvent, in crystallization zone 41, the temperature lowered, and the mixture containing naphthalene crystals passed to centrifugation zone 42 by line 43. The mixture is then centrifuged and the naphthalene crystals removed by line 44. A wash solvent, preferably the same solvent used in the extraction zone, may be employed and is taken from solvent storage zone 45 by line 46; the wash solvent is taken off by line 47 and may be recirculated to the extraction zone. A slip stream 49 is taken off from the filtrate recirculating line 48 so as to prevent a buildup of aromatics in the process. The filtrate, containing some naphthalene, is introduced into the solvent extraction zone 50 by line 48, and is contacted countercurrently with solvent from the storage zone by line 51 and from the centrifugation zone by line 47. A solvent fraction enriched in naphthalene-containing oil is taken off overhead by line 52, while a lean oil fraction, containing little or no solvent, is removed as a bottoms product by line 53. The lean oil is passed to heat zone 54, heated, and the solvent recovered therefrom by distillation, e. g., flashing in flash zone 55. The solvent-free lean oil is removed from the system as a by-product by line 56. The flashed solvent is taken from the flash zone 55 by line 57, condensed in condensing zone 58, and passed to solvent storage zone 45. The solvent fraction is passed by line 52 to heat zone 59, heated, and the solvent recovered therefrom by distillation, say flashing in flash zone 60. The flashed solvent is taken from the flash zone 60 by line 61, condensed in condensing zone 62 and passed to solvent storage zone 45 by line 63. The naphthalene-rich oil is cooled in cooler 64 and passed to the crystallization zone by line 65. The solvent storage zone is used to supply the extraction and wash solvents as needed in the process. As already described, the naphthalene-rich oil, devoid of solvent, is then contacted with the fresh feed in crystallization zone 41 and the naphthalene crystals separated therefrom in centrifugation zone 42.

By way of example, a refinery stock, a light cycle oil obtained by successive catalytic and thermal cracking of a naphthenic Coastal crude, boiling between 400° and 435° F. and containing 19.6% naphthalene, was extracted in three passes in accordance with the process described in Figure 1. The solvent employed was methanol at a 1.0 to 1.0 solvent-oil ratio by volume, and at a temperature of 72° F. The methanol layer from the first pass was flashed at less than 160° F. The naphthalene-containing oil, from which the solvent was removed, was then collected and cooled to atmospheric conditions of temperature and pressure. Naphthalene crystals formed, and the sample appeared to be about one-half solid material. The mixture contained about 33.3% naphthalene as determined by ultraviolet spectrophotometer analyses and was separated readily from the mixture by filtration or centrifugation under atmospheric conditions. Upon separation, the filtrate was recirculated for a second and third pass. The effluent oil from the third pass contained about 6.5% naphthalene.

A greater number of contact stages will remove even more of the naphthalene in the effluent oil which, of course, results in a higher recovery efficiency. At an extraction temperature in the range of about 70 to 75° F., four or five stages of countercurrent contact will produce good yields. When methanol is employed as the extractive solvent, the temperature of the extraction zone is most advantageously kept within the range of about 60 to 160° F. Above this range the system becomes miscible using methanol while below, solid naphthalene may form so as to impede operations.

I claim:

1. The method of recovering naphthalene from a naphthalene-containing stock which comprises contacting the stock with a solvent consisting of methanol at a temperature within the range from about 60° to 160° F. and a pressure whereby the methanol remains partially miscible with the stock and whereby both components are in the liquid phase, taking off a solvent fraction enriched in naphthalene-containing oil, separating the solvent therefrom, and then removing the naphthalene from the oil.

2. The method of recovering naphthalene from a naphthalene-containing stock which comprises contacting the stock with a solvent consisting of methanol at a temperature within the range from about 60° to 160° F. and a pressure whereby the methanol remains partially miscible with the stock and whereby both components are in the liquid phase, taking off overhead a solvent fraction enriched in naphthalene-containing oil, taking off as a bottoms product a lean oil fraction containing some solvent, separating the solvent from each fraction by distillation, condensing the solvent and recycling same, then removing the naphthalene in the rich oil, and recycling the filtrate to the extraction zone.

3. The method of recovering naphthalene from a naphthalene-containing stock which comprises contacting a naphthalene-rich cycle stock with a solvent consisting of methanol at a temperature within the range from about 60° to 160° F. and a pressure whereby the methanol remains partially miscible with the stock and whereby both components are in the liquid phase, taking off overhead a solvent fraction enriched in naphthalene-containing oil, taking off as a bottoms product a lean oil fraction containing some solvent, separating the solvent from each fraction by distillation, condensing the solvent and recycling same, then contacting the naphthalene-rich oil with a fresh naphthalene-containing stock, chilling the mixture and removing the naphthalene therefrom, and recycling the filtrate to the extraction zone.

References Cited in the file of this patent

UNITED STATES PATENTS

| Number | Name | Date |
|---|---|---|
| 2,321,117 | Wilcock | June 8, 1943 |
| 2,400,802 | Arnold | May 21, 1946 |
| 2,403,127 | Schulze | July 2, 1946 |
| 2,428,102 | Swietoslawski | Sept. 20, 1947 |
| 2,470,116 | Swietoslawski et al. | May 17, 1949 |